(12) United States Patent
Xu et al.

(10) Patent No.: US 7,426,213 B2
(45) Date of Patent: *Sep. 16, 2008

(54) MOBILE INTERNET PROTOCOL (IP) NETWORKING WITH HOME AGENT AND/OR FOREIGN AGENT FUNCTIONS DISTRIBUTED AMONG MULTIPLE DEVICES

(75) Inventors: Yingchun Xu, Buffalo Grove, IL (US); Kenneth L. Peirce, Jr., Barrington, IL (US); Matthew Harper, Arlington Heights, IL (US); Timothy G. Mortsolf, Lisle, IL (US)

(73) Assignee: UT Starcom, Inc., Alameda, CA (US)

( * ) Notice: Subject to any disclaimer, the term of this patent is extended or adjusted under 35 U.S.C. 154(b) by 995 days.

This patent is subject to a terminal disclaimer.

(21) Appl. No.: 10/793,992

(22) Filed: Mar. 4, 2004

(65) Prior Publication Data

US 2004/0184420 A1 Sep. 23, 2004

Related U.S. Application Data

(63) Continuation of application No. 09/354,659, filed on Jul. 16, 1999, now Pat. No. 6,738,362, which is a continuation-in-part of application No. 09/248,617, filed on Feb. 25, 1999, now Pat. No. 6,560,217.

(51) Int. Cl.
*H04Q 7/00* (2006.01)
*H04L 12/56* (2006.01)

(52) U.S. Cl. .................. 370/401; 370/329; 370/469

(58) Field of Classification Search ............ 370/252, 370/278, 282, 328, 329, 331, 349, 338, 401, 370/217, 352–356, 400, 469; 380/270; 455/432.1–444; 714/4; 709/217; 704/228

See application file for complete search history.

(56) References Cited

U.S. PATENT DOCUMENTS 5,528,595 A 6/1996 Walsh et al. ............. 370/402

(Continued)

FOREIGN PATENT DOCUMENTS

| EP | 0917328 | 5/1999 |
| WO | WO 0101969 | 1/1999 |

OTHER PUBLICATIONS

C. Perkins, Request for Comments 2002 (Oct. 1996).

(Continued)

*Primary Examiner*—John Pezzlo

(57) ABSTRACT

A mobile Internet Protocol service provider system implements home agent functionality in two separate devices. One device, the home registration agent, is devoted to registration of the mobile node and session control. The other device, the home tunneling agent, is devoted to tunneling and routing functions for the foreign agent. The home registration agent can be a general purpose computer. The home tunneling agent is preferably implemented in a robust routing device, such as an IP switch or router. Multiple home tunneling agents or home registration agents can be implemented in the respective devices as multiple instantiations of a home registration agent or home tunneling agent software program.

Foreign agent functionality for mobile IP networking can also be split into separate devices. In a preferred embodiment, a foreign registration agent handles session control and registration traffic with the home registration agent, and a foreign tunneling agent provides packet capsulation/decapsulation and routing services for the mobile node and exchanging data traffic with the home tunneling agent.

8 Claims, 4 Drawing Sheets

U.S. PATENT DOCUMENTS

| | | | | |
|---|---|---|---|---|
| 6,137,791 | A | 10/2000 | Frid et al. | 370/352 |
| 6,195,705 | B1 | 2/2001 | Leung | 709/245 |
| 6,377,982 | B1 | 4/2002 | Rai et al. | 709/217 |
| 6,400,722 | B1 | 6/2002 | Chauh et al. | 370/401 |
| 6,430,698 | B1 | 8/2002 | Khalil et al. | 714/4 |
| 6,738,362 | B1 | 5/2004 | Xu et al. | 370/329 |
| 2004/0234075 | A1* | 11/2004 | Leung | 380/270 |

OTHER PUBLICATIONS

Perkins, "Mobile IP", May 1997, IEEE Communications Magazine, pp. 84-99.

Charles E. Perkins, Mobile IP Design Principles and Practices, Addison-Wesley Wireless Communication Series, Chapter 4, pp. 55-93, (1998).

IETF RFC 2344, G. Montenegro (May 1998).

TIA Interim Standard (TIA-835-B) cdma2000 Wireless IP Network Standard (Revision of TIA/EIA/IS835A), Telecommunications Industry Association, (Sep. 2002).

Published International Preliminary Examination Report, PCT/US00/19280, dated Jul. 7, 1999.

International Search Report, PCT/US/19280, 3 Com Corporation, dated Feb. 5, 2001.

* cited by examiner

TYPE: TDB(ACTUAL VALUE OF OCTET MUST BE GRANTED BY THE IETF)

LENGTH: 6

RESERVED: 0

HOME AGENT CARE-OF-ADDRESS: THE IP ADDRESS OF HOME TUNNELING AGENT.

MOBILE INTERNET PROTOCOL (IP) NETWORKING WITH HOME AGENT AND/OR FOREIGN AGENT FUNCTIONS DISTRIBUTED AMONG MULTIPLE DEVICES

CROSS-REFERENCE TO RELATED APPLICATION

This is a continuation of application Ser. No. 09/354,659, filed on Jul. 16, 1999, now U.S. Pat. No. 6,738,362, which is a continuation-in-part of the patent application of Kenneth L. Peirce, et al., entitled VIRTUAL HOME AGENT SERVICE USING SOFTWARE-REPLICATED HOME AGENTS, application Ser. No. 09/248,617, filed Feb. 25, 1999, now U.S. Pat. No. 6,560,217, the entire contents of both of which are fully incorporated by reference herein.

BACKGROUND OF THE INVENTION

A. Field of the Invention

This invention relates generally to systems that provide mobile Internet Protocol (IP) networking, wherein a mobile communications device such as a portable laptop computer or personal digital assistant may communicate with a host computer on an IP network. More particularly, the invention relates to the architecture and arrangement of communications devices functioning as home agents and foreign agents that are used in such a system.

B. Description of Related Art

Public packet switched networks can be used to carry traffic to and from a mobile communications device, such as a laptop computer or personal digital assistant equipped with a cellular telephone modem. The basic architecture of mobile IP data networking is known in the art and described in several publications, including the Request for Comments document RFC 2002 (1996) and in the textbook of Charles E. Perkins, *Mobile IP Design Principles and Practices*, Addison-Wesley Wireless Communications Series (1998), both of which are fully incorporated by reference herein. Persons skilled in the art of mobile IP data networking are familiar with the contents of both of these documents and the devices used to implement mobile IP data networking in practice.

Basically, and with reference to FIG. 1, in Mobile IP communication, a wireless mobile node 10 communicates with a target host 12 on an IP network 14 by means of two devices, a "foreign agent" 16 and a "home agent" 18. Typically, foreign agent functionality is incorporated into a router or network access server chassis located on a mobile node's visited network 20. A radio access network linking the mobile node to the foreign agent 16 is not shown for purposes of simplicity in the present discussion. The foreign agent 16 provides routing services for the mobile node while it is registered with the home agent 18. The foreign agent 16 de-tunnels and delivers datagrams to the mobile node 10 that were tunneled by the mobile node's home agent 18. In the present specification, the term "tunneling" refers to packet re-addressing, such as performed by the home agent.

The traffic exchanged between the foreign agent 16 and the home agent 18 includes control traffic 22, e.g., registration request and registration reply messages and session control messages, and data traffic 24. The control traffic 22 terminates at the home agent. The data traffic 24 is routed from the mobile node's home network 26 to a second network 14 for delivery to the target host. The target host could be connected to the home network by any arbitrary number of intermediate IP networks, or could be on the mobile node's home network 26.

The home agent 18 is typically implemented in a router on a mobile node's home network 26. The home agent maintains current location information for the mobile node, through a variety of possible mechanisms, such as described in the patent application of Richard J. Dynarski, et al., "Dynamic Allocation of Wireless Mobile Nodes Over an Internet Protocol (IP) Network", Ser. No. 09/233,381, which is incorporated by reference herein. When one or more home agents are handling calls for multiple mobile nodes simultaneously, the home agent(s) are providing, in essence, a service analogous to virtual private network services. Each mobile node is typically associated with a separate home network and the routing path from that home network, through the home agent, to the foreign agent and mobile node is like a virtual private network for the mobile node.

Thus, from the above discussion, it can be seen that the home agent performs two separate and distinct tasks for the foreign agent and mobile node. First, the home agent 18 must perform an authentication and registration process to determine whether the mobile node is authorized to access the home network 26. This may involve checking the identification of the mobile node (such as, through use of the mobile node's unique serial number or manufacturing number), password authentication, and possibly checking that the mobile node's account is current and paid in full. The home agent registration and authentication functions may be performed in conjunction with, or with the assistance of, a second device, such as an authentication, authorization and accounting server such as a RADIUS server. See the patent application of Yingchun Xu, Ser. No. 08/887,313 filed Jul. 3, 1997 for further details.

Second, the home agent 18 has to tunnel data from the target host to the foreign agent, and provide tunneling services in the reverse direction, i.e., provide packet re-addressing for traffic from the foreign agent to the host 12. To coordinate tunneling in the reverse direction, the home agent provides a forwarding "care/of" address to the foreign agent to tell the foreign agent 16 where to tunnel traffic from the mobile node so that it can be sent to the host. This forwarding address is typically contained in a registration reply message sent to the foreign agent notifying the foreign agent that the mobile node is authenticated to communicate in the home network. In the prior art, the home agent is also the device that receives the tunneled traffic from the foreign agent for routing onto the home network, and therefore the forwarding address is the home agent's IP address.

The foreign agent also has to perform two distinct tasks for the mobile node, similar to that of the home agent. First, the foreign agent has to handle the registration and session control aspects for the mobile node, including sending registration request messages to the home agent and processing a registration reply message. Second, the foreign agent has tunneling responsibilities for forwarding data packets to the home agent for ultimate distribution to the destination, and de-tunneling data from the home agent and forwarding the data to the mobile node.

The known prior art for providing mobile IP networking services has embraced the concept of a single home agent, in a single chassis, for a given network. However, some larger scale providers of Mobile IP networking services may require multiple home agents on their networks in order to meet demand for mobile IP network services for a large distributed customer base. One possible approach to meeting the expected demand for home agent services is to provide multiple home agents, each home agent embodied in a separate chassis or device. Another approach is to provide a single home agent, but design the home agent such that it has an internal architecture to support multiple networks (e.g., multiple virtual private networks). This latter approach is not considered very attractive, in that management of the home agent would be cumbersome. Furthermore, the home agent would not be particularly fault tolerant, in that any mechanical or software problem in the home agent would potentially affect a large number of virtual private networks. In all the known prior art, the individual devices configured as home agents have implemented both home agent functions within the same device, i.e., registration functions and tunneling/ routing functions as described above. Similarly the prior art has embraced the concept of performing both the registration and tunneling responsibilities for a foreign agent in a single device, e.g., network access server.

SUMMARY OF THE INVENTION

The present invention represents an improvement to the above approaches contemplated by the prior art. The present invention contemplates distributing the home agent functionality across multiple devices, with one device devoted to handling the registration and authentication functions, and another device devoted to the routing and tunneling functions of a home agent. The present inventors have appreciated that the former functions, i.e., registration and authentication, are not particularly computationally intensive, and that a single general purpose computing device can handle a very large number of simultaneous registration and authentication transactions without any undue latency, management, or other problems, either alone or in concert with a RADIUS or Authorization, Authentication, and Accounting (AAA) server. On the other hand, the routing and inverse tunneling functions of a home agent are more CPU-intensive and better suited to more robust devices designed for such purposes, such as switches and routers. Thus, the present distributed home agent design of the present invention overcomes the scaling and management problems presented by prior art approaches and represents a simple, cost effective, and easily managed solution for providing mobile P network services, particularly for large scale providers of such services.

In another related aspect of the invention, the functionality of a single foreign agent is distributed across multiple devices. For example, the registration and session control functions of a foreign agent are assigned to a first device, referred to herein as a "foreign registration agent", such as a general purpose computer or network access server on the visited network. The tunneling functions of the foreign agent are assigned to one or more different devices, referred to herein as a "foreign tunneling agent."

In a system which implements both distributed home agents and distributed foreign agents, the foreign registration agent would exchange registration and session control messages with the home registration agent. The tunneling of data traffic between the mobile node and the host system would occur between the home tunneling agent and the foreign tunneling agent.

Thus, in a first aspect, the present invention is an improvement to a system that provides mobile Internet Protocol networking for a mobile node via a foreign agent and a home agent. The improvement comprises implementing the home agent in two separate entities or devices. These two separate entities comprise (1) a home registration agent handling registration requests for the mobile node, and (2) a home tunneling agent receiving traffic from the mobile node via the foreign agent and redirecting the traffic to a destination for the traffic.

In a preferred embodiment, the home registration agent generates a registration reply message in response to a registration request message associated with the mobile node. The home registration agent sends the registration reply message to the foreign agent. The registration reply message contains an address associated with the home tunneling agent, such as an IP address of the home tunneling agent, whereby the foreign agent tunnels the traffic from the mobile node to the home tunneling agent for transmission to the destination for the traffic. An extension to the mobile IP protocol can be used as a means for including the home tunneling agent's network address in the registration reply message.

In another aspect of the invention, a mobile Internet Protocol service provider system provides access to a network for a mobile node and enables the mobile node to communicate with a host on the network. The system comprises a first communications device comprising a home registration agent responsive to a registration request message associated with the mobile node. The system further includes a second communications device, different from the first communications device, comprising a home tunneling agent associated with the home registration agent, the home tunneling agent receiving traffic from the mobile node and redirecting the traffic to the network. In a representative embodiment, the system is operated by a wireless communications service provider, and typically a wireless communications service provider that is serving a large number of wireless customers and therefore must provide for a high number of mobile nodes simultaneously. As noted previously, the specific communication device that is used to implement the home registration agent and the home tunneling agent is not particularly important, but will be selected in view of the typical processing requirements of the home tunneling agents and the home registration agents. In a preferred embodiment, the home tunneling agent comprises a router.

In another aspect of the invention, a machine is provided for authenticating a mobile node for network access. The machine implements just the registration part of a home agent function, with the tunneling part of the home agent function being taken up by a separate device such as a router. The machine, which may be implemented as a general purpose computer or other suitable device, includes a central processing unit, an interface to the network, and a machine readable storage medium comprising a set of instruction for processing registration request messages associated with the mobile node and responsively generating registration reply messages. The registration reply message contains a field containing a network address for a home tunneling agent. The network address of the home tunneling agent is different from a network address assigned to the machine, because the home tunneling agent function is being performed in the separate device.

In yet another aspect, a method is provided for authenticating a mobile node for network access. In accordance with the method, a registration request message is generated and sent from a foreign agent to a home registration agent. The registration request message contains information used to determine whether said mobile node is authorized to access a network, such as the mobile device's unique International Mobile Subscriber Identity (IMSI) number and/or its Electronic Serial Number (ESN). The home registration agent then determines from the information in the registration request message whether the mobile node is permitted to access the network. This step may be performed with the assistance of a authorization, authentication and accounting server, e.g., a RADIUS server. The home registration agent then generates a registration reply message and sends the registration reply message from the home registration agent to the foreign agent.

If the step of determining results in a positive response, i.e., that the mobile device is authenticated or registered to use the network, the home registration includes in the registration reply message a network address of a home tunneling agent. The home tunneling agent is adapted to receive data traffic from the mobile node and direct the traffic onto the network. The foreign agent forwards data traffic from the mobile node to the home tunneling agent for transmission to the host or destination. The home registration agent and the home tunneling agent are preferably implemented in two separate communications devices. Similarly, the foreign agent functionality may be split up into two separate devices, one functioning as a foreign tunneling agent and another device functioning as a foreign registration agent. The foreign and home registration agents exchange the registration and session control messages, while the tunneling activity is handled by foreign and home tunneling agents.

These and still other features of the invention will be more apparent from the following detailed description of presently preferred and alternative embodiments of the invention.

BRIEF DESCRIPTION OF THE DRAWINGS

In the following description, reference will be made to the appended drawings, wherein like reference numbers refer to like elements in the various views, and in which.

DETAILED DESCRIPTION OF THE PREFERRED EMBODIMENT OF THE INVENTION

Figure 1:
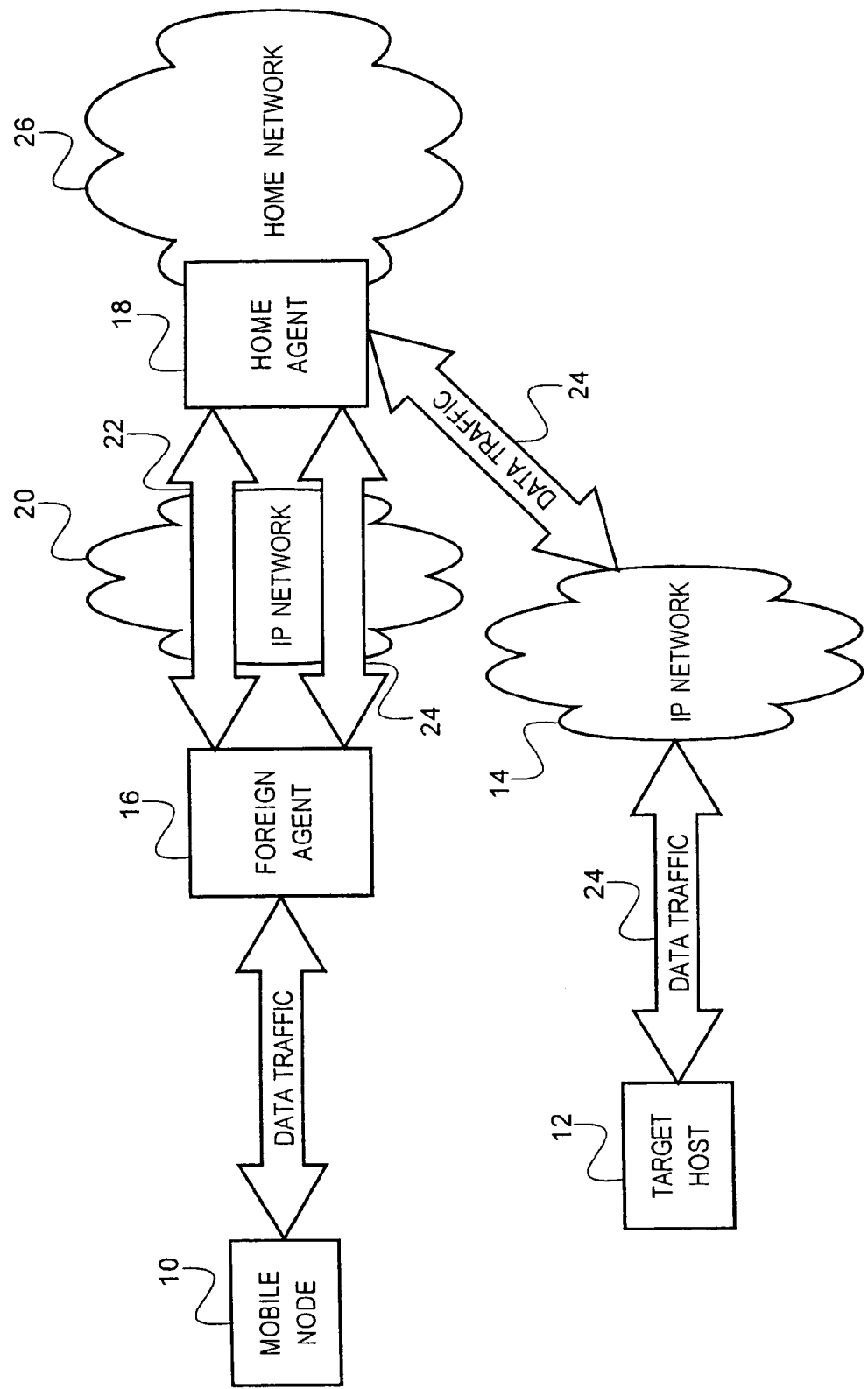
FIG. 1 is an illustration of a prior art mobile IP networking system.
Figure 2:
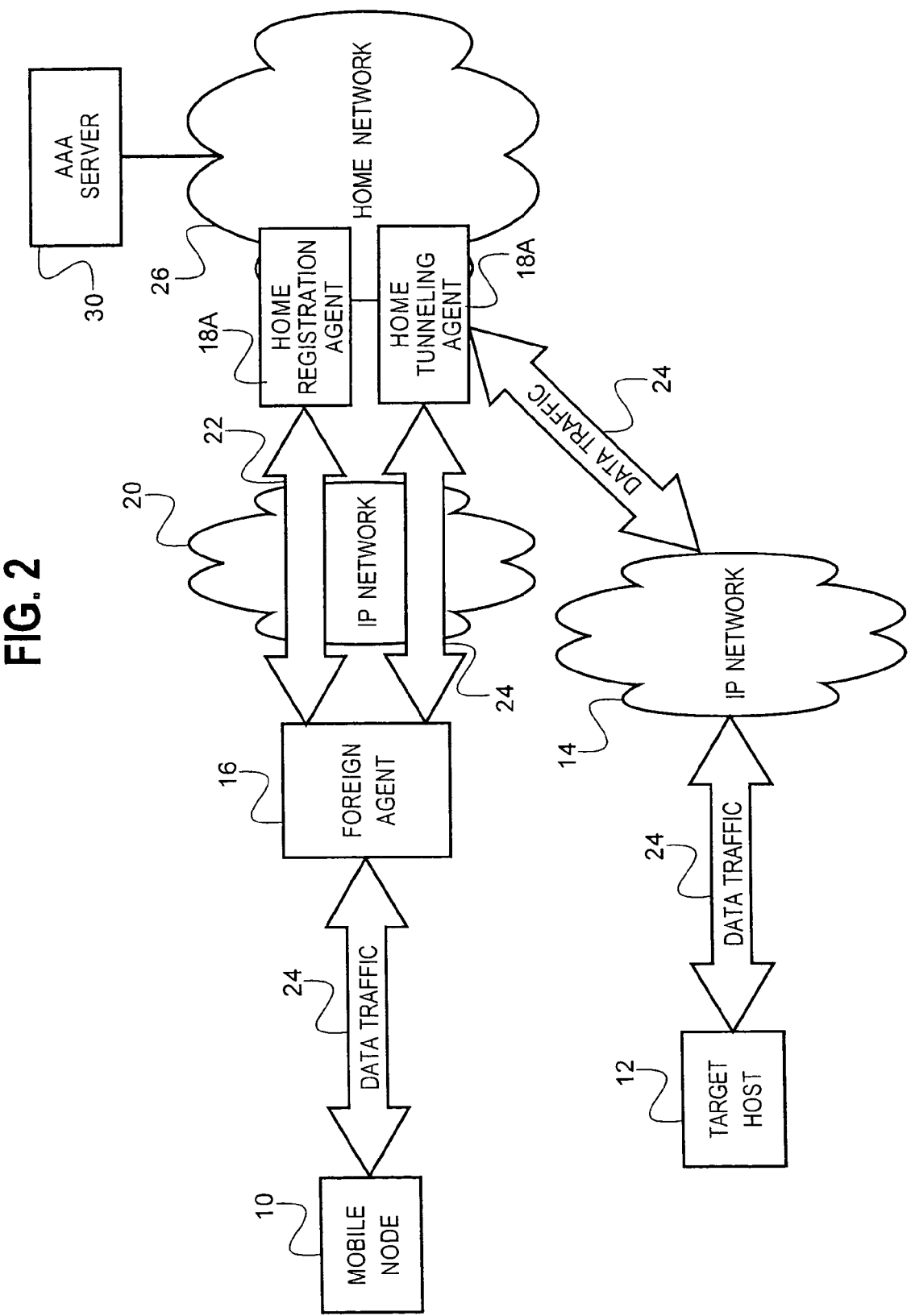
FIG. 2 is an illustration of a mobile IP networking system in accordance with a preferred embodiment of the invention, with the home tunneling agent and home registration functions being separated and performed to two separate devices.

With reference to FIG. 2, in accordance with a principal aspect of the invention the home agent function as provided by RFC 2002 is separated and performed by two (or more) separate devices. In the embodiment of FIG. 2, device 18A is designated as a home registration agent, dedicated to registration of mobile nodes, and the other device 18B is designated as a home tunneling agent. In the simplest embodiment of the invention, the home agent function is split up into one home registration agent 18A and one home tunneling agent 18B. Thus, the home agent functionality specified in RFC 2002 is broken up in to two basic tasks: registration of mobile nodes and tunneling/routing for the mobile nodes and foreign agents, with the registration function being performed by a home registration agent 18A, and the tunneling and routing functions being performed by the home tunneling agent 18B.

A need for more than one home tunneling agent per home registration agent may exist, depending on the size of the mobile IP customer base, the capacity or utilization of the router chosen to implement the home tunneling agent function, or other factors.

As shown in FIG. 2, control traffic 22 consisting of, among other things, registration request messages and registration reply messages, is exchanged between the foreign agent 16 and the home registration agent 18A. The foreign agent 16 could be embodied in one device, or could be broken up into two separate devices, a foreign registration agent and a foreign tunneling agent, as explained below. The home registration agent 18A does not receive or process the underlying data traffic 24 going to and from the foreign agent and mobile node. This data traffic is instead sent to the home tunneling agent 18B, which handles all the routing and tunneling functions for the foreign agent and mobile node. While the situation illustrated in FIG. 2 shows only one mobile node 10, it will be appreciated that in practice the registration and tunneling functions will be performed simultaneously and in parallel for many mobile nodes at once.

The home registration agent 18A will be typically implemented as a machine such as a general purpose computer loaded with a software program having a set of instructions for handling registration request messages from foreign agents pursuant to RFC 2002. Such software programs are either known to persons skilled in the art or readily developed from the RFC 2002 document. The home registration agent 18A tells the foreign agent where to tunnel data traffic 22 by sending an IP address of the home tunneling agent 18B to the foreign agent, as described in further detail below.

The home tunneling agent 18B receives traffic from the mobile node via the foreign agent and redirects the traffic to a destination for the traffic, such as the host computer 12 on the network 18. Similarly, the home tunneling agent 18B tunnels traffic from the host 12 to the foreign agent 16 for delivery to the mobile node 10. Since the home tunneling agent will likely be performing home tunneling agent functions for a large number of mobile nodes simultaneously, the device that is designated to perform the home tunneling agent function should be the type of robust device that is designed to perform such functions. An IP router would be a suitable device for the home tunneling agent 18B.

Ordinarily, the home registration agent 18A will serve a plurality of mobile nodes simultaneously, and potentially thousands of such nodes. In a large scale implementation of mobile IP, it is preferred that the home registration agent works in conjunction with a plurality of home tunneling agents so that the tunneling function for all the mobile nodes can be distributed across more than one tunneling agent. A distributed base of home tunneling agents also facilitates load balancing among the tunneling agents, and provides some redundancy and fail-over capacity in the event that one of the home tunneling agents experiences hardware or software problems, or needs to be taken off line for maintenance, upgrading, repair, etc.

Method of Operation

The distribution of home agent functions between a home registration agent in one device and a home tunneling agent in another device works as follows. A mobile node 10 establishes a PPP connection with a foreign agent 16 over a wireless service provider network (not shown). The foreign agent 16 forwards a registration request message to the home registration agent 18A. The details of a registration request message are set forth in RFC 2002. The home registration agent 18A receives the registration request message and generates a registration reply message, indicating whether the mobile node 10 is allowed to access the network 26. The home registration agent may perform this authentication function alone, or, more preferably, with a separate AAA or RADIUS server 30. The details of registration of a mobile node are not considered particularly important for the present invention and are known to persons skilled in the art.

The registration reply message is then sent from the home registration agent 18A to the foreign agent 16. The registration reply message contains an IP address assigned to a home tunneling agent 18B that is designated to handle the tunneling and routing functions for data traffic between the mobile node and the host 12. The foreign agent 16 tunnels data traffic from the mobile node to the home tunneling agent for transmission to the destination for the traffic, such as the host 12. Similarly, the home tunneling agent 18B tunnels data traffic from the host 12 to the foreign agent for transmission over the PPP connection to the mobile node 10.

Mobile IP Service Provider System

From the above discussion, it can be seen that we have described a mobile IP service provider system for providing network access for a mobile communications device. The system includes a first communications device 18A, such as a general-purpose computer, comprising a home registration agent responsive to a registration request message associated a mobile node and generating a registration reply message. The system also includes a second communications device 18B, embodied in a platform or device different from the first communications device, comprising a home tunneling agent associated with the home registration agent. The home tunneling agent receives traffic from the mobile node and directs the traffic to the network. The system may be operated by any suitable entity, for example by a wireless communications service provider. The wireless communications service provider may furnish all the basic elements for providing mobile IP services, such as the foreign agents, and the home registration and home tunneling agents. Or, the entity may simply provide home tunneling and home registration agents, and work with other entities that own or manage the foreign agents.

In a preferred embodiment, at least one of the first and second communications devices implementing the home registration agent and home tunneling agents, respectively, comprises a router. Since the functions provided by the home tunneling agent 18B are more directly analogous to IP routing functions performed by routers, the home tunneling agent function will normally be performed in a router. Other devices could be used, however.

A number of different communications devices are all suitable platforms for implementation as a home registration agent. One example is a general-purpose computer. Another example would be an AAA or RADIUS server. Another example would be a router.

In any event, the home registration agent 18A will typically comprise a machine having a central processing unit, an interface to a network, and a machine readable storage medium (such as EPROM, ROM or other type of memory device) containing a set of instructions for processing registration request messages associated with a mobile node and responsively generating registration reply messages. The details of a preferred registration reply message format are described in the next section.

Mobile Internet Protocol Extension for Separate Home Tunneling Agent

Figure 3:
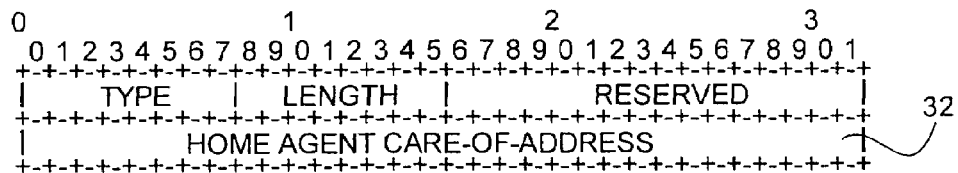
FIG. 3 is an illustration of a mobile IP Protocol extension that could be used by the home registration agent to transmit the IP address of the home tunneling agent and thereby inform the foreign agent where to tunnel traffic from the mobile node destined for the target host.

The registration reply message, in a preferred embodiment, contains a field containing a network address for a home tunneling agent. This may be embodied as an extension to the mobile IP protocol specified in RFC 2002. The mobile IP protocol in RFC 2002 supports the separating of foreign agent addresses and foreign agent care of addresses. To support the separation of the home agent address and the home agent care-of-address during reverse tunneling (all data traffic that is bound for the home node is sent to the home tunneling agent and is tunneled by the home tunneling agent back to the mobile node via the foreign agent), a new extension as shown in FIG. 3 is defined. This extension will be carried inside a Mobile IP Registration Reply message when the mobile node 10 has been successfully authenticated. In the extension of FIG. 3, the four byte home agent care-of-address field 32 comprises the IP address of the home tunneling agent. The foreign agent tunnels traffic to this address as described above.

If the extension of FIG. 3 does not appear in the Registration Reply message, the foreign agent must use the home registration agent IP address as the home agent care of address.

Embodiment with Multiple Home Agent Instantiations in a Single Chassis

In yet another alternative embodiment of the invention, multiple home registration agent or home tunneling agent functions could be implemented within a single chassis. The multiple home registration agents are implemented as multiple instantiations or threads of a home registration agent software program in a general purpose computer or other suitable device running a Microsoft Windows NT or a similar operating system. Each instantiation of the software would run independently of the other software instantiations and process registration requests and generate registration replies independent of the other software-instantiated home registration agents.

Similarly, multiple home tunneling agents could be implemented as multiple software instantiations running simultaneously in a router or switch. Thus, instead of implementing multiple discrete hardware devices to perform multiple home tunneling agent functions, multiple home tunneling agents could be provided in a single router, as separate instantiations of a home tunneling agent software program. Each instantiation or thread would be assigned a unique IP address so that each session for multiple mobile nodes can be kept separate in the single router.

Further details on the implementation of multiple home agent functions in a single chassis or device are described in the parent application of the present inventors, entitled VIRTUAL HOME AGENT SERVICE USING SOFTWARE-REPLICATED HOME AGENTS, Ser. No. 09/248,617, filed Feb. 21, 1999.

Distributed Foreign Agent Functions Among Multiple Devices

Figure 4:
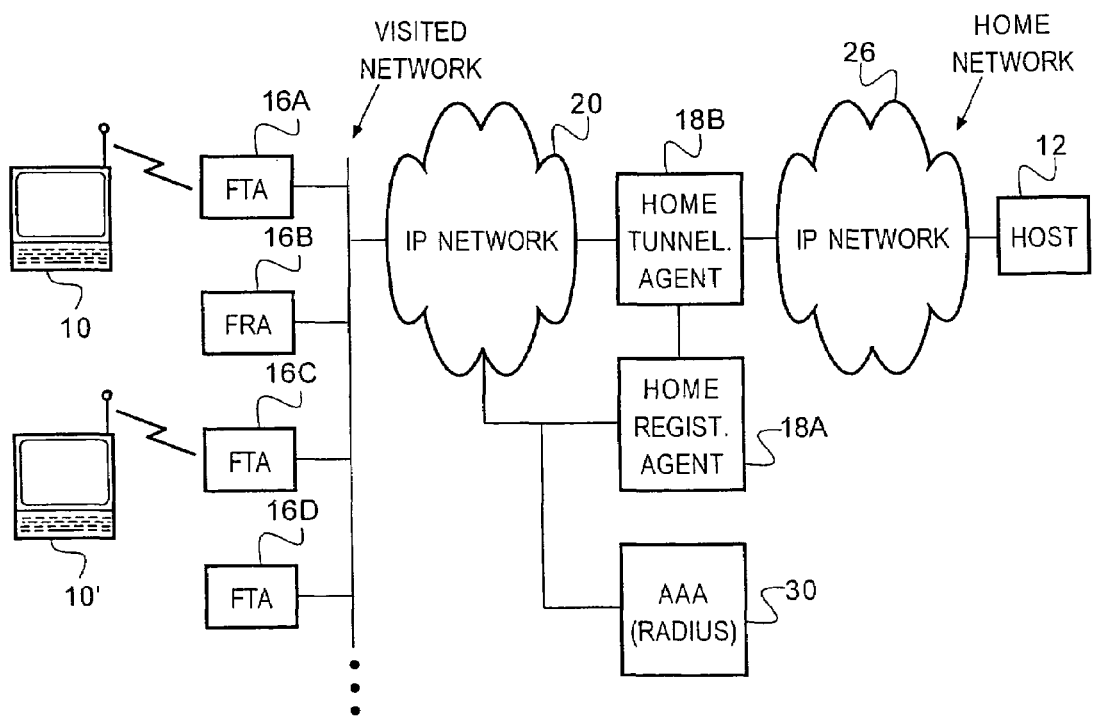
FIG. 4 is an illustration of a mobile IP networking system in accordance with an alternative embodiment of the invention in which the foreign agent functions are separated into two separate devices, a foreign registration agent and a foreign tunneling agent.

Referring now to FIG. 4, as noted above the functions of a foreign agent can be grouped into two groups that mirror the functions performed by the home agent: (1) session control and registration functions, and (2) tunneling and packet capsulation/decapsulation. In the embodiment of FIG. 4, the foreign agent functions are separated out into multiple devices. The session control and registration functions for the mobile node 10 are performed in one device (such as general purpose computer) identified as a foreign registration agent (FRA) 16B. The tunneling and packet capsulation/decapsulation functions are distributed among three different foreign tunneling agents (FTA), 16A, 16C and 16D. These devices may be implemented as network access servers of the general type described in the patent to Dale M. Walsh et al., U.S. Pat. No. 5,528,595. For any given mobile node, only one foreign tunneling agent will normally be involved with packet forwarding and capsulation/decapsulation functions, but that functionality could be handed off to another foreign tunneling agent in the set in the event that the mobile device moves out of range from the first foreign tunneling agent 16A, or in the event that the foreign tunneling agent 16 goes off line.

Furthermore, since the node 10 is by definition a mobile node, it may likely go out of range in the wireless network of the foreign tunneling agent 16A, and be in the position represented by reference numeral 10'. The hand-off of tunneling duties between the FTA 16A and the new FTA 16C can be effectuated without the need for re-registration of the mobile node via the foreign registration agent 16B, home registration agent 18A, AAA server 30, etc. Instead, a new care of address assigned to the foreign tunneling agent 16C would be sent to the home tunneling agent 18B notifying it where to tunnel data traffic from the host 12 to the foreign tunneling agent.

Figure 5:
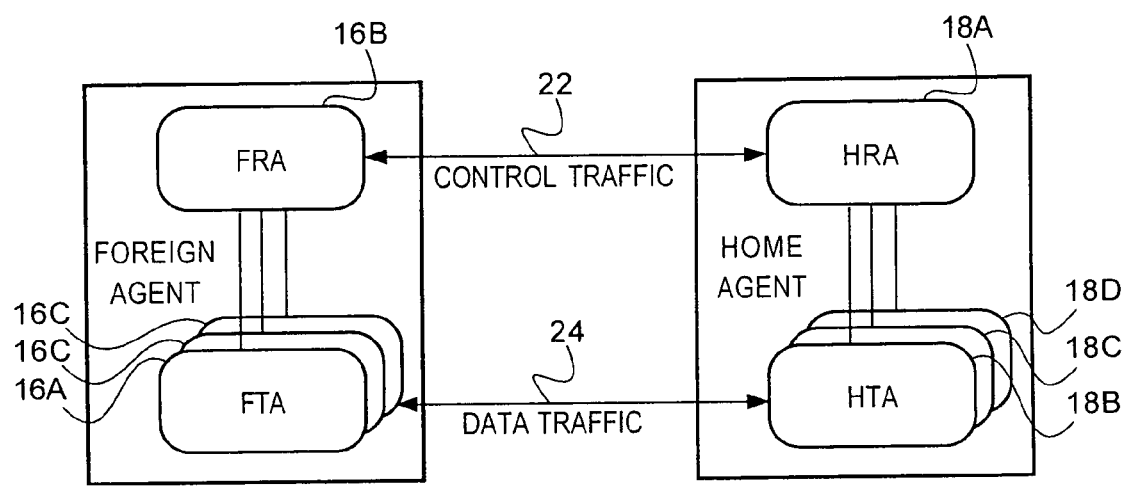
FIG. 5 is an illustration of an architecture for mobile IP networking in which the foreign agent functions and the home agent functions are both split up into multiple separate devices.

Referring now to FIG. 5, another possible architecture is illustrated for mobile IP networking in which the foreign agent functions and the home agent functions are both split up into multiple separate devices. Specifically, the foreign agent function is broken down into one foreign registration agent 16B in one device and a plurality of foreign tunneling agents 16A, 16C and 16D embodied in another device, such as a router or network access server. The foreign registration agent 16B is responsible for agent discovery procedures and mobile node registration relay, as provided in RFC 2002. The foreign registration agent exchanges session control and registration messages (control traffic 22) with the home registration agent (HRA) 18A, as shown in the drawing. The home registration agent 18A may authenticate and register the mobile node alone or in conjunction with an AAA or RADIUS server.

The foreign tunneling agents are managed by the foreign registration agent 16B, such as using a simple network management protocol (SNMP) packet or otherwise. In the illustration, there are 3 such foreign tunneling agents 16A, 16C and 16D. These foreign tunneling agents are implemented in a separate device from the foreign registration agent. The three foreign tunneling agents could be embodied in 3 different IP routers, or, as indicated in the drawing, as three different instantiations of a foreign tunneling agent software program in a single IP router. The foreign tunneling agents are responsible for IP packet capsulation/decapsulation and IP packet tunneling and forwarding as described in RFC 2002. They forward data traffic 24 to and receive data traffic 24 from the home tunneling agents 18B, 18C, and 18D.

The distribution of foreign agent functionality across multiple devices allows for load balancing among foreign tunneling agents and provides some redundancy and fail-over capacity.

The architecture of FIG. 5 also has advantages in that it is readily adaptable to a voice over IP system (VoIP) within the same architecture, with the distributed base of foreign agents corresponding to a distributed set of VoIP gateways and the home agents corresponding to a distributed base of VoIP gatekeepers.

From the forgoing description, persons of skill in the art will appreciate that various modifications to the preferred embodiments can be made without departure from the true scope and spirit of the invention. This true scope and spirit will be found be reference to the appended claims, interpreted in light of the forgoing specification.

We claim:

1. A mobile Internet Protocol service provider system for providing a mobile node access to a network and for enabling the mobile node to communicate with a host on the network, comprising:

a first entity comprising a mobile IP foreign registration agent for transmitting a mobile IP registration request message associated with the mobile node to a mobile IP home agent and receiving a registration reply message from the mobile IP home agent; and a second entity, operationally separate from the first entity, comprising a mobile IP foreign tunneling agent associated with the mobile IP foreign registration agent, the mobile IP foreign tunneling agent receiving data traffic from the mobile node and directing the data traffic to the mobile IP home agent, wherein the mobile IP registration request message is received and responded to by the mobile IP home agent in accordance with a mobile IP protocol and wherein at least one of the mobile IP foreign registration agent and the mobile IP foreign tunneling agent comprises a network access server that terminates a point-to-point protocol communication link with the mobile node.

2. The system of claim 1, wherein at least one of the mobile IP foreign registration agent and the mobile IP foreign tunneling agent comprises an Internet Protocol router.

3. The system of claim 1, wherein the mobile IP foreign registration agent exchanges registration and session control traffic with a mobile IP home registration agent and the mobile IP foreign tunneling agent tunnels data traffic to a mobile IP home tunneling agent, the mobile IP home registration agent and the mobile IP home tunneling agent being embodied in two operationally separate communication devices.

4. A mobile Internet Protocol service provider system for providing a mobile node access to a network and enabling mobile nodes to communicate with a host on the network, comprising:

a mobile IP foreign registration agent for transmitting a mobile IP registration request message associated with the mobile node to a mobile IP home agent and for receiving a registration reply message from the mobile IP home agent; and a chassis comprising a plurality of mobile IP foreign tunneling agents, wherein each of the mobile IP foreign tunneling agents is associated with the mobile IP foreign registration agent, the mobile IP foreign tunneling agents receiving data traffic from the mobile nodes and directing the data traffic to the mobile IP home agent, wherein the mobile IP foreign registration agent is implemented in a network access server that terminates point-to-point protocol communication links with the mobile nodes.

5. The system of claim 4, wherein the mobile IP foreign registration agent and the plurality of mobile IP foreign tunneling agents have different Internet Protocol addresses.

6. The system of claim 4, wherein the plurality of mobile IP foreign tunneling agents are implemented as separate instantiations of foreign tunneling agent software.

7. The system of claim 4, wherein the mobile IP foreign registration agent is embodied in an operationally separate device from the plurality of mobile IP foreign tunneling agents.

8. The system of claim 4, wherein the mobile IP foreign registration agent comprises an interface for communicating with an Authorization, Authentication and Accounting (AAA) server, wherein the mobile IP foreign registration agent queries the AAA server via the interface to determine if the mobile nodes are authorized to access the network.

* * * * *